US012627758B2

(12) United States Patent　　　　(10) Patent No.:　US 12,627,758 B2
Fowler et al.　　　　　　　　　　　　(45) Date of Patent:　May 12, 2026

(54) CALL ENHANCEMENT SERVICE VIA IN-NETWORK BRANDED CALLING DELIVERY

(71) Applicant: FIRST ORION CORP., North Little Rock, AR (US)

(72) Inventors: Julie Sara Fowler, Kirkland, WA (US); Robert Collin Seely, Little Rock, AR (US)

(73) Assignee: FIRST ORION CORP., North Little Rock, AR (US)

( * ) Notice: Subject to any disclaimer, the term of this patent is extended or adjusted under 35 U.S.C. 154(b) by 116 days.

(21) Appl. No.: 18/324,118

(22) Filed: May 25, 2023

(65) Prior Publication Data

US 2024/0396993 A1　　Nov. 28, 2024

(51) Int. Cl.
*H04M 3/42*　　　(2006.01)
*H04M 3/436*　　(2006.01)

(52) U.S. Cl.
CPC ....... *H04M 3/42042* (2013.01); *H04M 3/436* (2013.01)

(58) Field of Classification Search
CPC .......................... H04M 3/42042; H04M 3/436
USPC ........................................ 379/142.05, 142.17
See application file for complete search history.

(56) References Cited

U.S. PATENT DOCUMENTS

| | | | | |
|---|---|---|---|---|
| 8,077,702 B2 * | 12/2011 | Blomkvist | .......... | H04M 7/0042 |
| | | | | 379/142.01 |
| 8,094,800 B1 * | 1/2012 | Smith | ............... | H04M 3/42059 |
| | | | | 379/211.01 |
| 8,533,864 B1 * | 9/2013 | Kostrzewski | ...... | A41D 13/0015 |
| | | | | 2/69 |
| 8,553,864 B2 * | 10/2013 | Chatterjee | ......... | H04M 3/42068 |
| | | | | 379/142.01 |
| 2003/0028671 A1 | 2/2003 | Mehta et al. | | |
| 2006/0148459 A1 * | 7/2006 | Wolfman | ............ | H04M 1/7243 |
| | | | | 455/415 |
| 2007/0047523 A1 | 3/2007 | Jiang | | |
| 2015/0063552 A1 * | 3/2015 | Bender | ............. | H04M 3/42059 |
| | | | | 379/142.05 |
| 2018/0343336 A1 * | 11/2018 | Oh | ..................... | H04M 1/72439 |
| 2020/0162615 A1 * | 5/2020 | Gayaldo | ........... | H04M 3/42042 |
| 2021/0021649 A1 | 1/2021 | Rathod | | |
| 2021/0044696 A1 * | 2/2021 | Gray | ..................... | H04W 12/06 |
| 2021/0099573 A1 * | 4/2021 | van Rensburg | ....... | H04L 9/0894 |
| 2021/0144243 A1 | 5/2021 | Aroxa et al. | | |
| 2021/0241312 A1 | 8/2021 | Kuskey et al. | | |
| 2022/0086276 A1 * | 3/2022 | Ranalli | ................. | H04L 9/3247 |
| 2023/0351171 A1 | 11/2023 | Smith-Rose et al. | | |
| 2023/0362299 A1 * | 11/2023 | Ranalli | ............... | H04M 3/4365 |

OTHER PUBLICATIONS

International Search Report issued in the International Application No. PCT/US24/31142, mailed on Sep. 24, 2024.

* cited by examiner

*Primary Examiner* — Binh Kien Tieu

(57)　　　　　　　　ABSTRACT

One example may include receiving a call event message associated with a call from a calling entity at a server, extracting call data from the call event message identifying enhanced content delivery instructions associated with the calling entity, retrieving enhanced call content to include with the call, and providing a portion of the enhanced call content to a call recipient device and a link to additional portions of the enhanced call content.

14 Claims, 15 Drawing Sheets

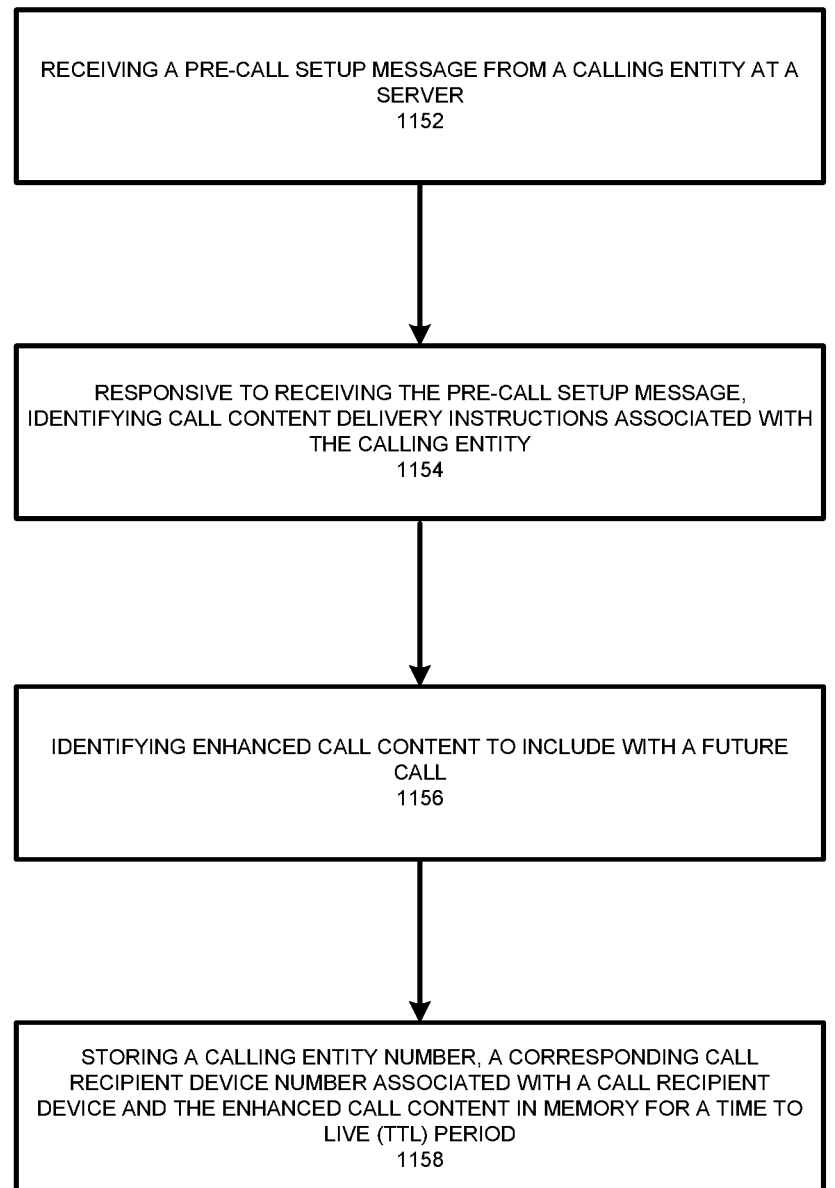

RECEIVING A PRE-CALL SETUP MESSAGE FROM A CALLING ENTITY AT A
SERVER
1152

RESPONSIVE TO RECEIVING THE PRE-CALL SETUP MESSAGE,
IDENTIFYING CALL CONTENT DELIVERY INSTRUCTIONS ASSOCIATED WITH
THE CALLING ENTITY
1154

IDENTIFYING ENHANCED CALL CONTENT TO INCLUDE WITH A FUTURE
CALL
1156

STORING A CALLING ENTITY NUMBER, A CORRESPONDING CALL
RECIPIENT DEVICE NUMBER ASSOCIATED WITH A CALL RECIPIENT
DEVICE AND THE ENHANCED CALL CONTENT IN MEMORY FOR A TIME TO
LIVE (TTL) PERIOD
1158

FIG. 11B

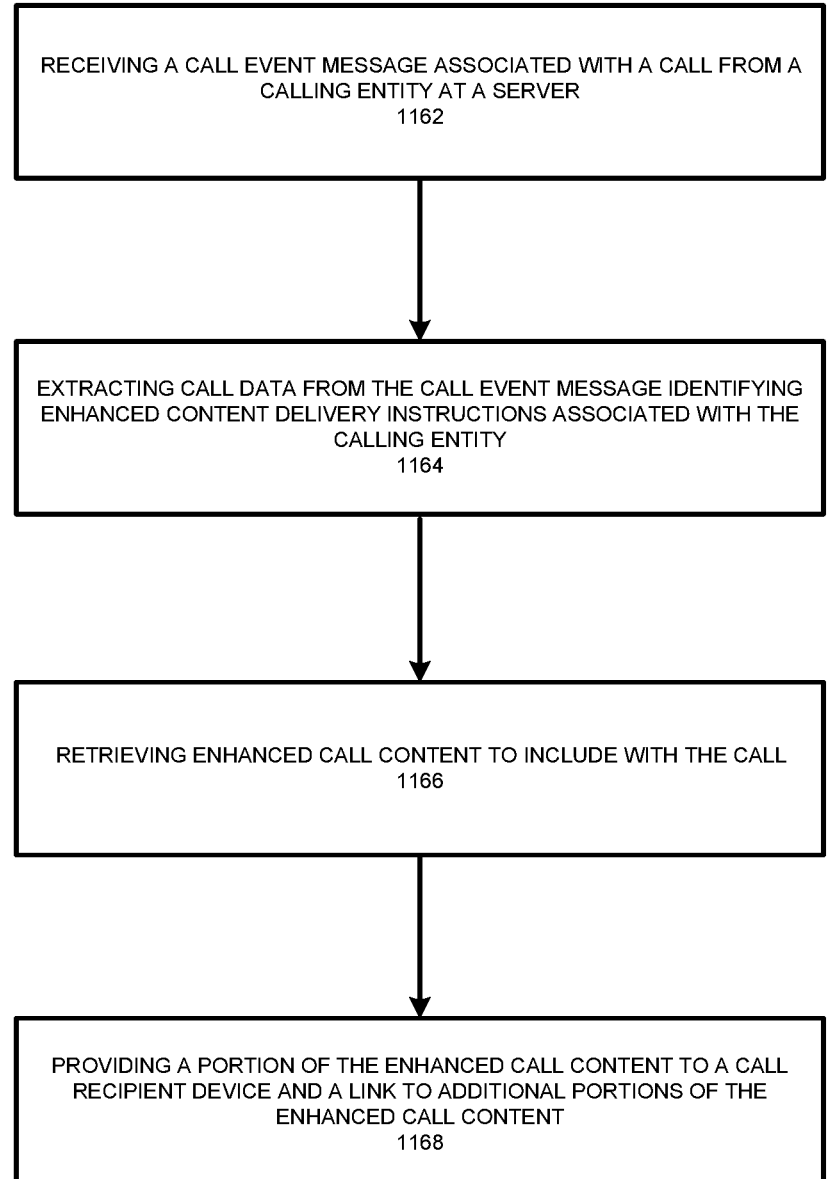

RECEIVING A CALL EVENT MESSAGE ASSOCIATED WITH A CALL FROM A
CALLING ENTITY AT A SERVER
1162

EXTRACTING CALL DATA FROM THE CALL EVENT MESSAGE IDENTIFYING
ENHANCED CONTENT DELIVERY INSTRUCTIONS ASSOCIATED WITH THE
CALLING ENTITY
1164

RETRIEVING ENHANCED CALL CONTENT TO INCLUDE WITH THE CALL
1166

PROVIDING A PORTION OF THE ENHANCED CALL CONTENT TO A CALL
RECIPIENT DEVICE AND A LINK TO ADDITIONAL PORTIONS OF THE
ENHANCED CALL CONTENT
1168

CALL ENHANCEMENT SERVICE VIA IN-NETWORK BRANDED CALLING DELIVERY

CROSS-REFERENCE TO RELATED APPLICATION

This application is related to co-pending U.S. non-provisional patent application Ser. No. 18/324,116, filed on May 25, 2023, entitled, "PRE-CALL MANAGEMENT OF CALL ENHANCEMENT SERVICES FOR IN-NETWORK BRANDED CALLING DELIVERY," which was filed on the same day and incorporated herein by reference in its entirety.

BACKGROUND

Conventionally, mobile device users receive calls from undesired sources every day and sometimes several times an hour depending on the particular day. The source numbers which are used to dial the users may be local numbers, long-distance numbers, anonymous numbers, spoofed numbers, etc. The calls may be spam calls, scam calls, robocalls, etc. With recent updates to smartphones and the call screen user interfaces used during a call, the sources of the calls are generally displayed in some capacity to permit the user to identify whether to answer the phone call or not, such as caller ID or other data services.

Branded calling has emerged as a call management strategy for legitimate businesses to successfully reach their customers. Branded calling is a process enabling businesses to present their company assets on the called devices. Examples of company assets include, but are not limited to, calling name, reason for the call, and/or a company logo.

Delivering branded calling is complex as it requires onboarding the enterprise, securely managing their company assets, telephone numbers, and their calling campaigns ("programs"), not to mention providing the technology to insert the assets into the call setup signaling. Additionally, the company/enterprise is responsible to protect the end user devices against branded calls which are illegally spoofed by third parties.

Companies and service providers struggle with many facets of branded calling, especially how to reach as many end customers as possible securely and safely while protecting the calls against illegal spoofing. The industry has attempted to standardize branded calling by leveraging the 'STIR/SHAKEN' infrastructure. The intention of STIR/SHAKEN rich call data (RCD) is to couple branded calling with the authentication/verification service protection of STIR/SHAKEN. However, there are significant concerns with providing branded calling this way. The industry leaders know STIR/SHAKEN is not a truly effective process to protect against scam calls and it adds tremendous complexity to the overall process and call flow.

While branded calling delivery methods require technology for the enterprise to safely and securely make their assets available for branding, the originating side of the call does not require keys or certificates, a signing function, or other special tools or requirements that also impact intermediate networks and service providers as well. By focusing on the terminating side of the call, the focus is on interworking the assets into the call signaling toward the device and ensuring the call's legitimacy. The result may be a secure, branded call complying with the policies and requirements of the terminating service provider's end customers.

SUMMARY

Example embodiments of the present application provide at least a method that includes at least one of receiving a pre-call setup message from a calling entity at a server, responsive to receiving the pre-call setup message, identifying call content delivery instructions associated with the calling entity, identifying enhanced call content to include with a future call, and storing a calling entity number, a corresponding call recipient device number associated with a call recipient device and the enhanced call content in memory for a time to live (TTL) period.

Another example embodiment may include an apparatus that includes a receiver configured to receive a pre-call setup message from a calling entity, responsive to the pre-call setup message being received, identify, via a processor, call content delivery instructions associated with the calling entity, identify enhanced call content to include with a future call, and store a calling entity number, a corresponding call recipient device number associated with a call recipient device and the enhanced call content in memory for a time to live (TTL) period.

Still another example embodiment may include a non-transitory computer readable storage medium configured to store instructions that when executed cause a processor to perform, receiving a pre-call setup message from a calling entity at a server, responsive to receiving the pre-call setup message, identifying call content delivery instructions associated with the calling entity, identifying enhanced call content to include with a future call, and storing a calling entity number, a corresponding call recipient device number associated with a call recipient device and the enhanced call content in memory for a time to live (TTL) period.

Still another example embodiment may include a method that includes one or more of receiving a call event message associated with a call from a calling entity at a server, extracting call data from the call event message identifying enhanced content delivery instructions associated with the calling entity, retrieving enhanced call content to include with the call, and providing a portion of the enhanced call content to a call recipient device and a link to additional portions of the enhanced call content.

Still another example embodiment may include an apparatus that includes a receiver configured to receive a call event message associated with a call from a calling entity, a processor configured to extract call data from the call event message identifying enhanced content delivery instructions associated with the calling entity, retrieve enhanced call content to include with the call, and provide a portion of the enhanced call content to a call recipient device and a link to additional portions of the enhanced call content.

Still yet another example embodiment may include a non-transitory computer readable storage medium configured to store instructions that when executed cause a processor to perform receiving a call event message associated with a call from a calling entity at a server, extracting call data from the call event message identifying enhanced content delivery instructions associated with the calling entity, retrieving enhanced call content to include with the call, and providing a portion of the enhanced call content to a call recipient device and a link to additional portions of the enhanced call content.

BRIEF DESCRIPTION OF THE DRAWINGS

FIG. 11B illustrates an example process of performing a pre-call operation according to example embodiments.

FIG. 11C illustrates an example process of performing a pre-call and subsequent call setup operation according to example embodiments.

DETAILED DESCRIPTION

Figure 1:
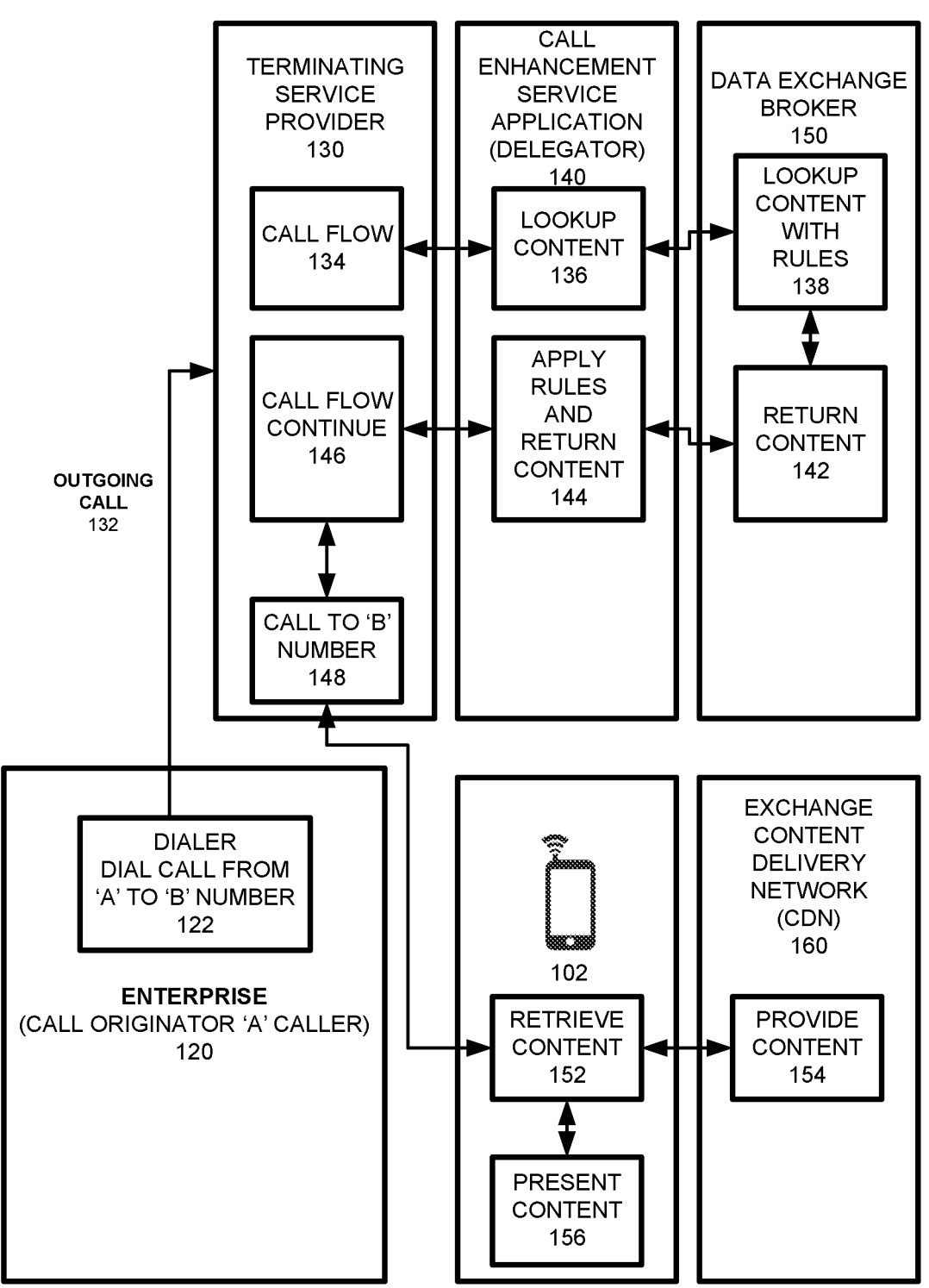
FIG. 1 illustrates a call enhancement call flow process according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call content management of content in association with calls to and from mobile device users. Enterprise entities (e.g., government, corporate, etc.) may desire to have their services readily identified to mobile device users when providing appointments, services, advertising, etc. Mobile device users require secure communication channels to reduce fraud associated with scam callers and other falsified entities seeking to monetize from users using unexpected and undesirable approaches, such as solicitation calls and mobile device messages (SMS).

Call enhancement services (CES) may be provided as a communication exchange ("exchange"), a call enhancement service application (CESA), and/or a content delivery network (CDN). Each entity of the call enhancement platform may be an enterprise server, a cloud server, and may be separate or common server devices which are accessible by mobile devices, enterprise entities and other third parties which are participating in the call enhancement process. The CESA may be deployed within a dedicated network 'delegator' device but does not have to be limited to one particular entity in a private network and/or via a cloud computing network. The 'exchange' is a call and data processing computer or other processing entity that manages a branded calling program(s). A 'program' is a group of content/assets, a schedule, and other information that utilizes call data, such as associated telephone numbers, and provides pairing and matching of information for transfer purposes. An organization can have more than one program operating concurrently, and the program that is selected/usable at any particular time may be based on call requirements, except for the case of a pre-call function, in which a valid schedule is required to deliver branded communications. Programs can be created, deleted, and updated. Schedules, telephone numbers, and assets can be added, deleted, and updated. Data inputs provided to the 'exchange' may come from a customer portal or lightweight APIs or both. The 'exchange is also the provisioning entity to the CESA that delivers the branded calling experience to a service provider. The 'exchange' uses brokers to facilitate the program's data management with the CESA. A valid program is required along with a validity schedule. Pre-call functionality defines the calling/called number pair for a specific upcoming call and any limited period of time in which the call must be placed.

The CESA is responsible for implementation of branded calling programs in real-time during a terminating call setup process of a call. The CESA will utilize the valid program information from the exchange as well as the capability of fetching up-to-date data in real-time. The CESA can be a hosted solution or in a service provider's network, in either scenario, the CESA must brand calls based on matching incoming call signaling data with an exchange program by applying policies and interworking the company assets into the call signaling stream upon a successful match of caller 'A'/callee 'B' data with stored call data.

For purposes of this disclosure, the denoted 'A' entity/caller will be a call originator, such as an enterprise entity that dials a call to another entity, such as an end user or call recipient 'A' entity/callee. In one example, the 'program' may provide a picture or brand logo which can be quite large with respect to a user mobile device interface. Instead of attempting to pass such rich content or enhanced call content assets in-band during call setup, the assets may be placed in a content delivery network (CDN), for example a cloud resource network and the URL of the asset may be provided with the call signaling for the terminating device to fetch. The CDN may be used to store certain content and/or enhanced content ahead of a call and a terminating device may retrieve the content and share the content with the called device in the event that the enhanced content is not already stored or shared with the called device.

FIG. 1 illustrates a call enhancement call flow process according to example embodiments. Referring to FIG. 1, a call flow is illustrated for a call enhancement service branded call. A call can be coming from another network or originated on the same network as a call origination device 'caller' and/or a call destination device 'callee'. The call enhancement service application (CESA) 140 may be used in conjunction with the data exchange broker 150 and a content delivery network (CDN) 160 on the terminating side of the call. For an on-network call which originates and terminates on a same network, the enhancement data paired with the call can be performed on the originating side of the call, and if the call exits the network all the assets can be removed from the signaling before sending the call to the peer network.

The exchange broker 150 can manage different policies for different terminating service providers (TSP) 130. What is displayed to the terminating device for a customer may be compliant to each TSP's local policies. The branded call decision process is performed in real-time on a per call basis prior to the call being presented to the callee 102. Businesses and organizations may register their call entities in a customer portal to initiate the branded calling process. The first operation may be vetting (verifying) the entity and verifying its legitimacy before approving it as a customer. Even after successful initial vetting, continuous vetting is performed to ensure proper practices.

A call may be initiated from an enterprise or similar entity 120 via a dialer which includes a call being placed from an 'A' number entity to a 'B' number 122. The outgoing call 132 may be processed by a terminating service provider network entity 130 and the call flow 134 may include notifying a CESA 140 to identify content 136 that may be paired with the call based on the 'A' number, 'B' number or both. A data exchange broker 150 may perform a lookup query to identify rules 138 for the call handling process. Content may be retrieved 142 by the broker 150 which is stored in a database associated with the 'A' and/or 'B' parties. Any rules for applying the content 144 are identified (e.g., include images, include name, include reason for call, do not include images, do not include reason, do not include name, etc.) depending on the 'A' and/or 'B' entity rules. The call flow is then continued 146 by the terminating service provider 130 and a call is initiated 148 to the 'B' entity.

The calling telephone number(s) ('A' number(s)) are vetted for the right to use (TN-RTU) to ensure the entity 120 has the legitimate right to originate calls from the number used and this may include any newly acquired telephone number (TNs). Any anomalies detected results in deactivating the associated program and calls not being branded. Once a business/organization 120 is approved, the entity can upload their branded assets. These assets are also vetted to ensure compliance with the service provider's local policies as well as general vetting against illicit or inappropriate images or language, etc. After the vetting process successfully completes, the company/enterprise is granted the proper permissions to start creating programs and associate phone numbers and assets with their programs.

Branding a call with enhanced content is managed using programs. The exchange 150 is responsible for the program data and providing the CESA 140 with the data needed to deliver the programs for the business or organization. Calling numbers 'A' and/or 'B' number must be setup ahead of a call in order to be considered for call enhancement purposes, and a program must be unique to a specific calling number ('A-number') and called number ('B-number')—or range of calling/called numbers. A single calling/called number pair is the most secure option, but the called number range can even be "global" for an entire numbering plan if the enterprise wishes to include global call support.

Programs are distributed to the exchange brokers 150 that are responsible for pushing the program data to the CESA, which is stored locally for fast access during call processing. Originating phone numbers and programs can also be setup with for authenticating the call to protect against call spoofing (fraudulent calling). Programs for call management are added/modified/deleted, and the data must be made available to the CESA as quickly as possible to ensure there are no branded calling service interruptions. Once a call is processed for delivery to the called party 103, the call terminating party can receive the call indication and retrieve the enhanced content 152 from a CDN 160 which provides the content 154 upon request. The call content is then presented 156 during the call delivery process.

Figure 2:
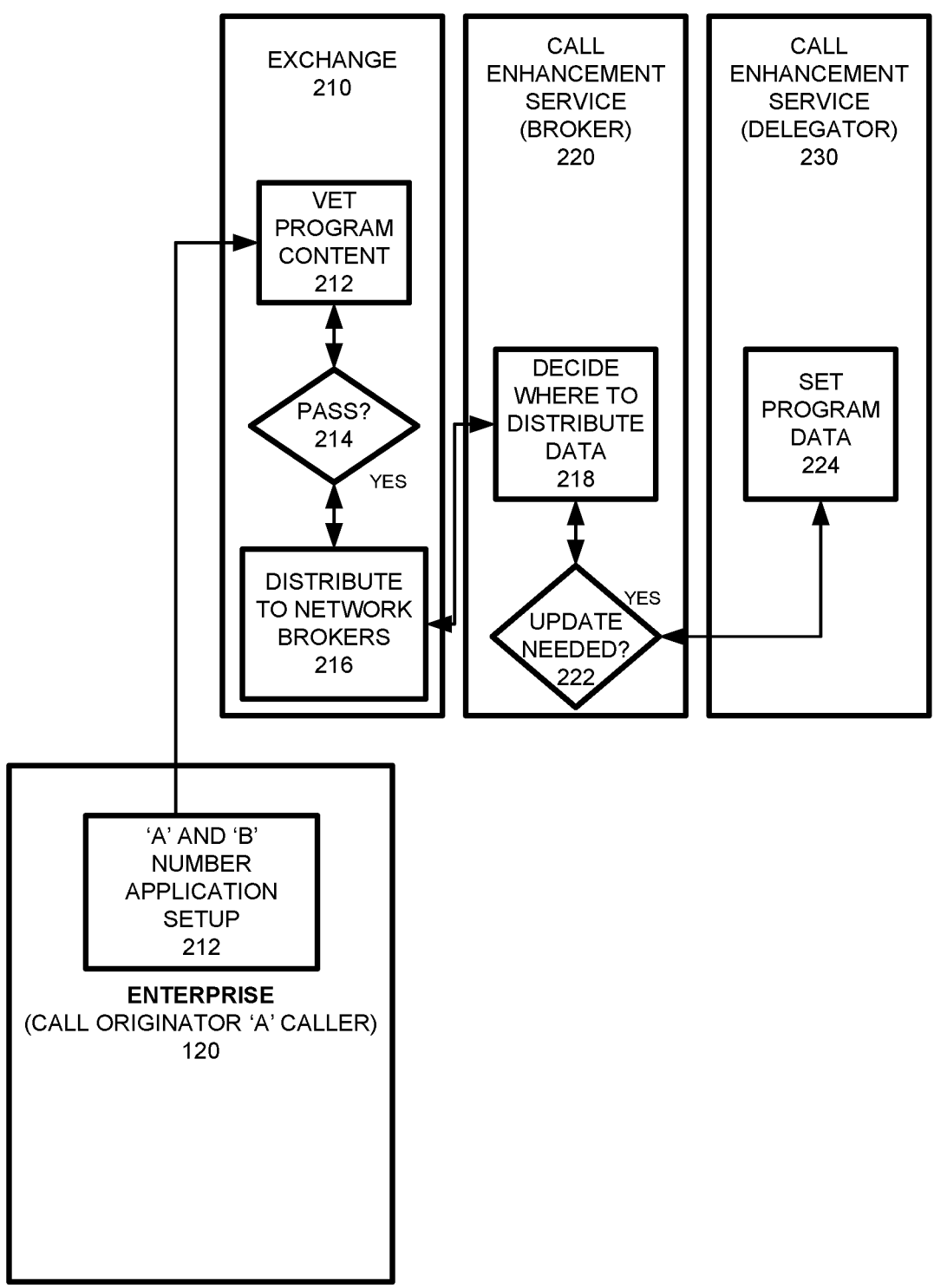
FIG. 2 illustrates a call enhancement service 'A' and 'B' number program setup process according to example embodiments.

FIG. 2 illustrates a call enhancement service 'A' and 'B' number program setup process according to example embodiments. Referring to FIG. 2, the high-level flow of branded calling 'A' and/or 'B' number program data for the call enhancement service (CESA) includes the application 212 for the enterprise communicating with the exchange service 210 to vet/examine 212 program content for that particular enterprise entity and if the screening passes 214 then the call can be distributed to the network brokers 216 to perform CESA services 220 which include determining the enhanced data to distribute 218, the callee preferences and settings and whether an update is needed 222 to complete the program data retrieval and content distribution/replication/population process. If an update is needed 222, the delegator 230 can provide the program data update needed 224 and the subsequent 'A' and 'B' number call attempts may receive the correct enhanced data during a call process.

Figure 3:
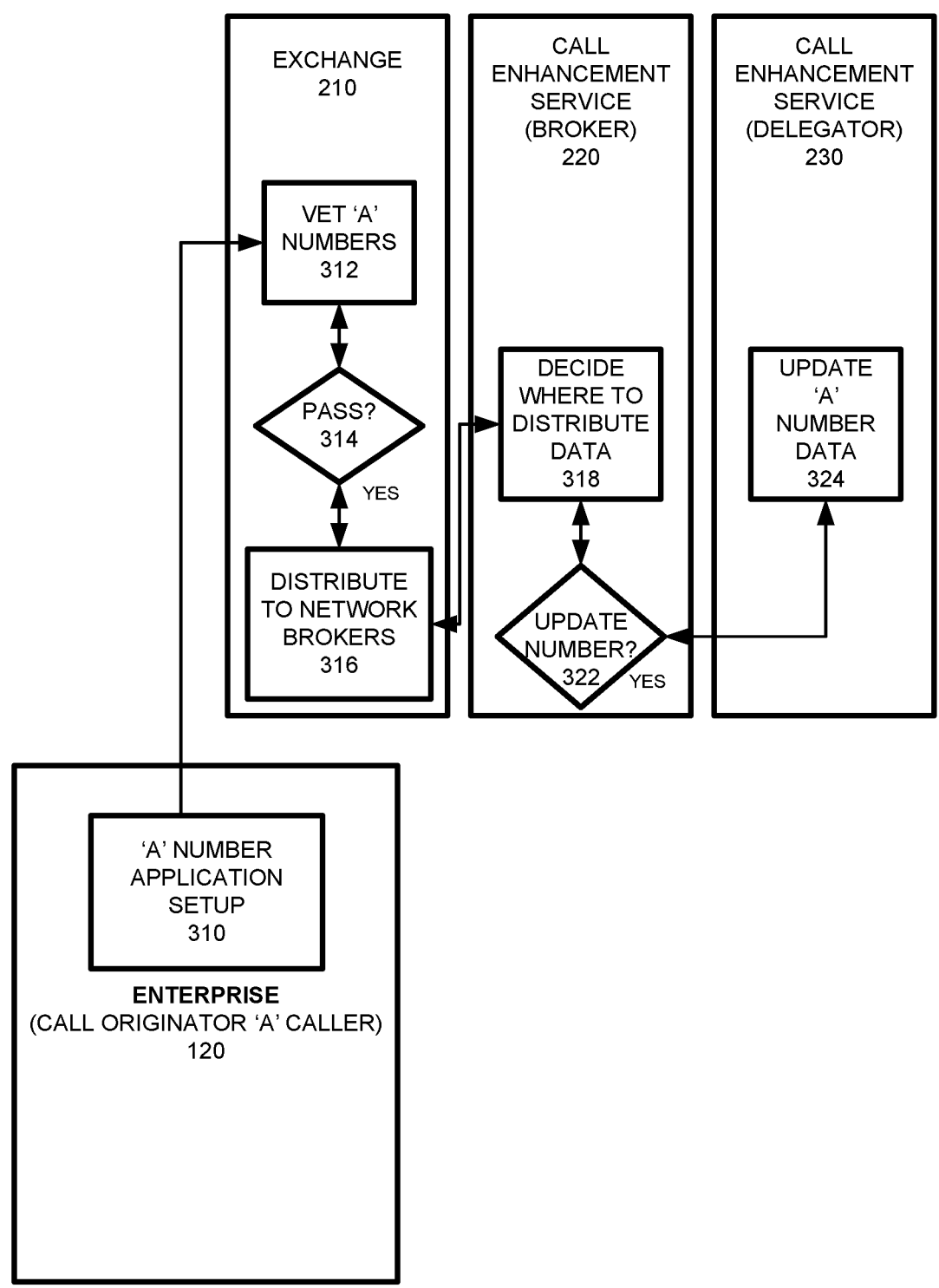
FIG. 3 illustrates a call enhancement service 'A' number program setup process according to example embodiments.

FIG. 3 illustrates a call enhancement service 'A' number program setup process according to example embodiments. Referring to FIG. 3, unlike the example in FIG. 2, a business or organization setting up call program data for a global call management program may include performing an 'A' number setup process 310. The 'A' numbers can be vetted 312 by the exchange 210 and the other operations 314-324 are similar with the exception of 324 which specifically updates the 'A' number data 324. As a result, the subsequent 'A' and 'B' number call attempts may receive the correct enhanced data during a call process.

Figure 4:
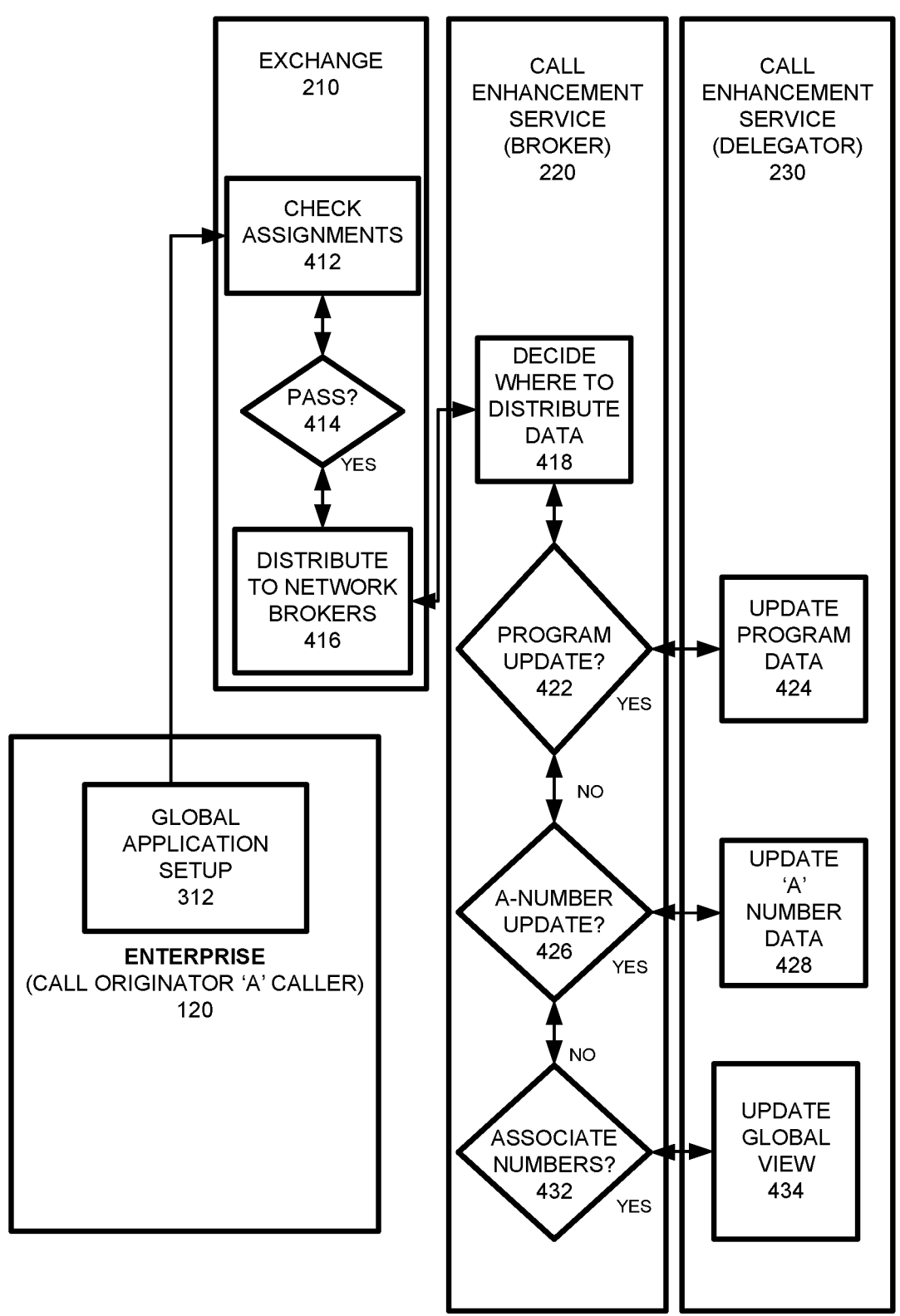
FIG. 4 illustrates a call enhancement service global program setup process according to example embodiments.

FIG. 4 illustrates a call enhancement service global program setup process according to example embodiments. Referring to FIG. 4, the global application setup function 312 communicates with the exchange 210 to check assignments for access rights and if they pass 414 then the application can be distributed to the network brokers 416 which decide where to distribute the enhanced call data 418. Also, a determination is made as to whether the program requires any updates 422 and if so then the delegator 230 can update the program 424. The process continues by deter-mining if 'A' number updates are required 426 and if associate numbers are identified 432. The delegator 230 can update 428 and provide a global view 434 of the call data. A global program that is not requiring a specific 'A' and 'B' number pairing may utilize such an example process.

Figure 5:
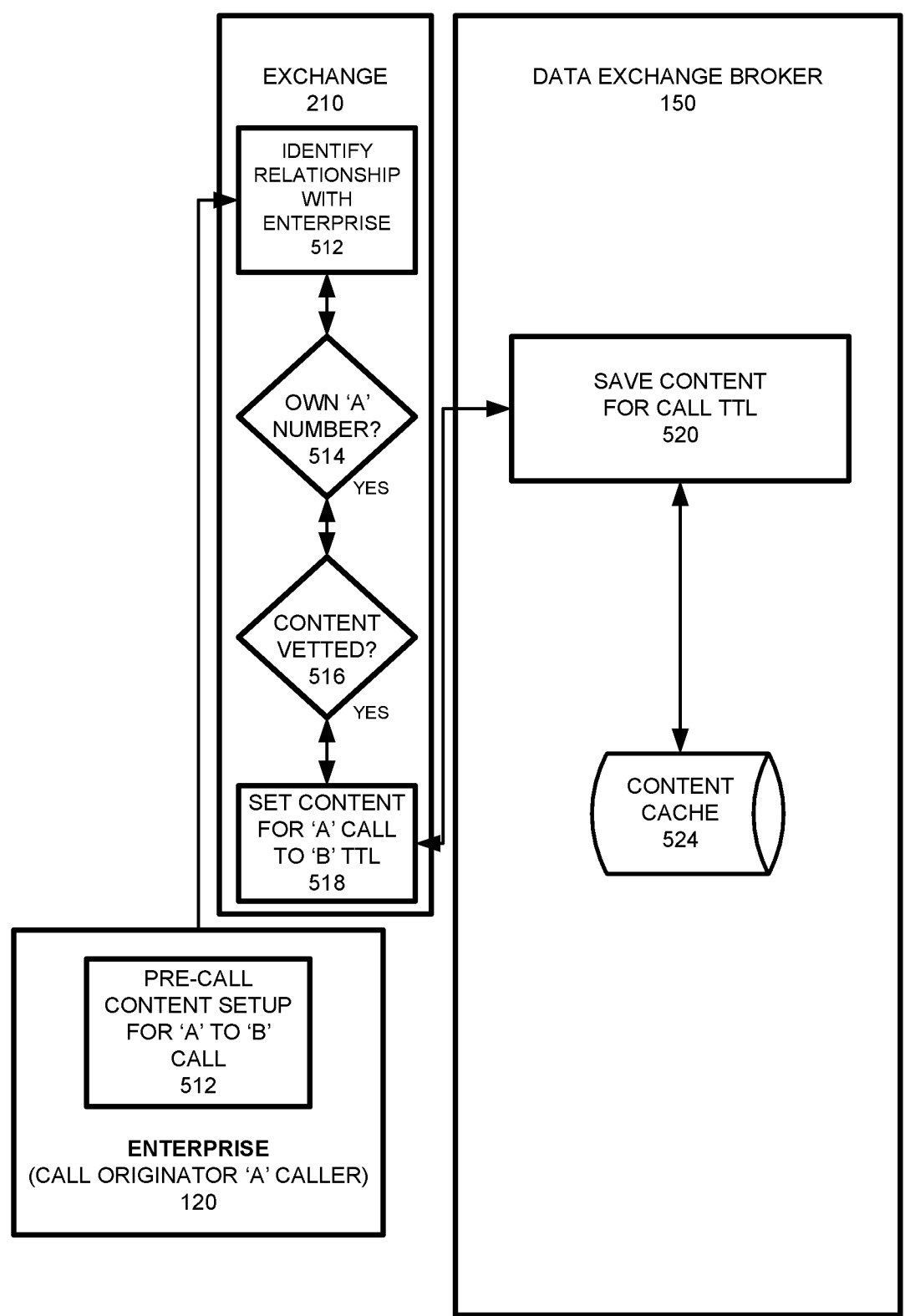
FIG. 5 illustrates a call enhancement pre-call service process according to example embodiments.

FIG. 5 illustrates a call enhancement pre-call service process according to example embodiments. The pre-call flow permits a call originator to place a truly authenticated branded call for a specific calling/called ('A'/'B') number pair. In operation, the pre-call content setup for a call 512 is performed by an enterprise entity 120 and is sent to an exchange 210 which identifies the relationship 512 with the enterprise 120 and whether a recognized 'A' number 514 is used and whether the content is vetted 516 prior to setting the content for the call pair for a specific time 518 (time to live (TTL)), such as 5 minutes, 1 minute, etc. The broker 150 may save the content for the call based on the TTL 520 in a content cache 524 and discard the content once the TTL has matured.

When the call originator's calling platform, such as a contact center is integrated with the exchange pre-call API, the calling and called numbers for a placed call are sent to the exchange broker 150 to be stored in a cache for the CESA to fetch during call processing. A specific time-to-live (TTL) for the call can also be assigned depending on a preference or security rating assigned to the call relationship. If no specific TTL is identified then a default TTL value will be assigned to the enhanced call content preservation. The program content is established for the program ahead of the call as it must be vetted before any call can be assigned content. A call management schedule is not needed in this example as the program validity is constrained by the TTL or even by a single call setup permitting the content to be valid for a single call. Additionally, although vetting is still required, there can also be a default or preferred program assigned to the calling number for easier and quicker inte-gration. In general, the TTL being used may be a pre-call TTL that establishes a time period for a cache record ahead of an API call performed by the delegator.

On the terminating side of a call, the CESA is aware the originating number has the pre-call service based on data pushed from the exchange broker 150 and any already stored program content. During call processing, the CESA will perform a real-time API query to the exchange broker 150 to confirm a caller/callee ('A'/'B') pair match, and additionally, may receive new program content specific to the specific called party ("John, ABC Co. calling about your recent order.", etc.). The pre-call flow may be optional but is recommended as it makes the call virtually impossible to spoof as the window of opportunity to complete the call is very short and the call is specific to a single calling/called number pair.

Figure 6:
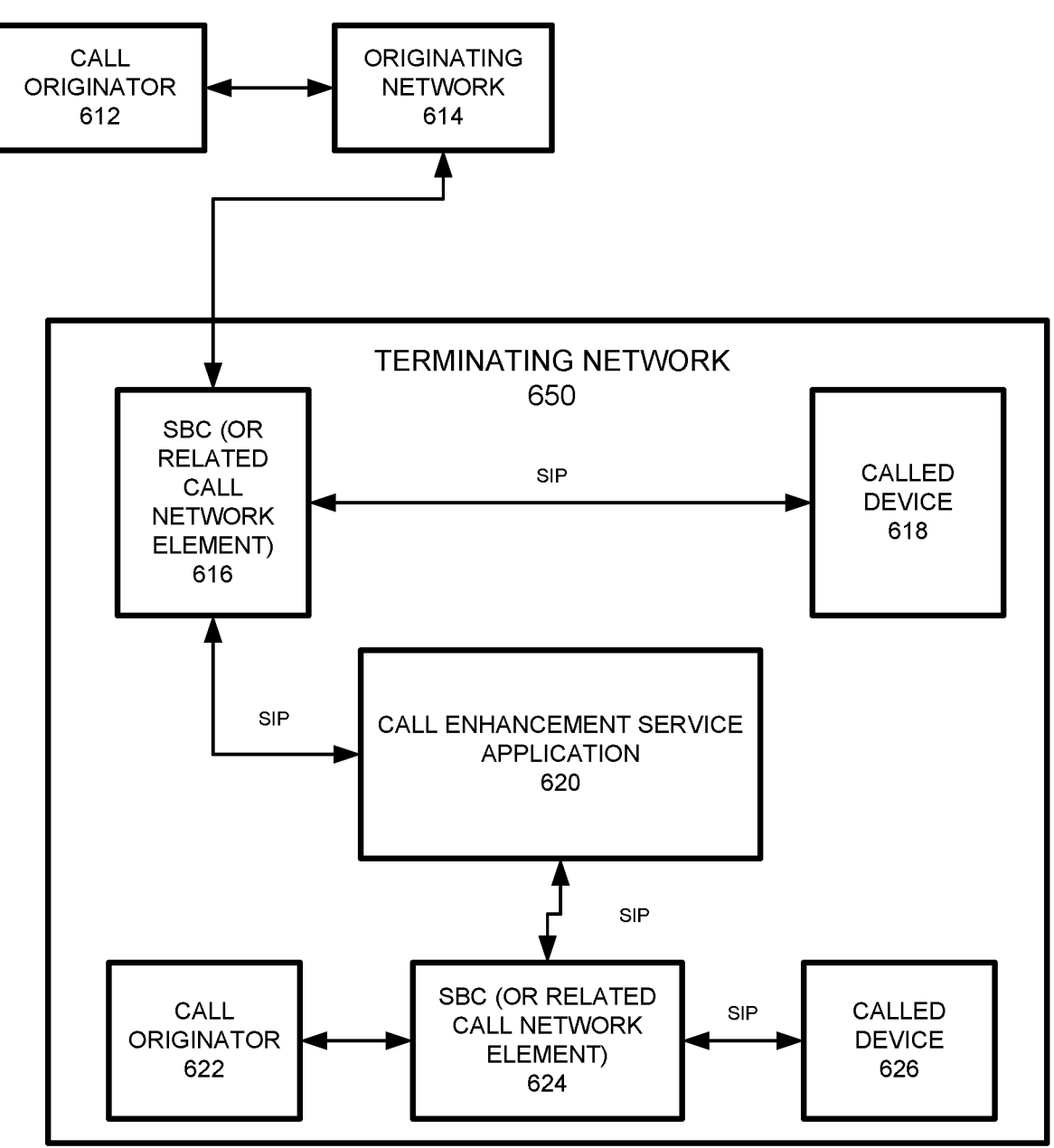
FIG. 6 illustrates a call enhancement service process with SIP integration according to example embodiments.

FIG. 6 illustrates a call enhancement service process with SIP integration according to example embodiments. Refer-ring to FIG. 6, the network integration and service logic used during a call enhancement service is part of the terminating service provider's network signaling flow, either directly or indirectly. The CESA 620 will provide the branded calling assets based on program matching and policies. In this example, the protocols used include session initiation pro-tocol (SIP) and the service provider (SP) may also use SIP and REST API.

In operation, the call originator 612 may establish a call to an originating network 614. The terminating network 650 will receive the call via a session border control (SBC) or related call element 616, and the CESA 620 requires pro-gram information, and the data is pushed from an exchange broker. For pre-call setup, the CESA 620 also supports the API to the exchange check pair broker. Each call is indi-vidually inspected in real-time for program matching and policies. Branded calling is handled on a call-per-call basis. The called device 618 will receive the call once the CESA 620 provides the necessary call vetting procedures.

The CESA 620 will also have the network connectivity implemented with the TSP's network element. Using SIP as the example, a call flow may use a SIP INVITE with SIP 302 response back to the originating network element, but other standard SIP flows can be used. In the same network the call originator 622 may also communicate with a SBC 624 and the CESA 620 to reach an in-network called device 626. The SBC 624 may be outside the network.

During processing of the call, if the CESA 620 determines a program match exists, the branded assets will be added into the SIP response message sent to the network. For example, the CESA 620 may perform populating the 'From' and/or 'P-Asserted-Identity' header display name with the calling name, adding a subject header with a reason for the call text, and adding a call-info header with the logo file CDN URL location to retrieve the image file. The TSP's network 650 then permits the headers to flow through their network to the end device unmodified. If there is not a program match, the CESA returns a standard SIP response with no branded elements or, optionally, may handle the call differently based on a service preference by the originator.

Figure 7:
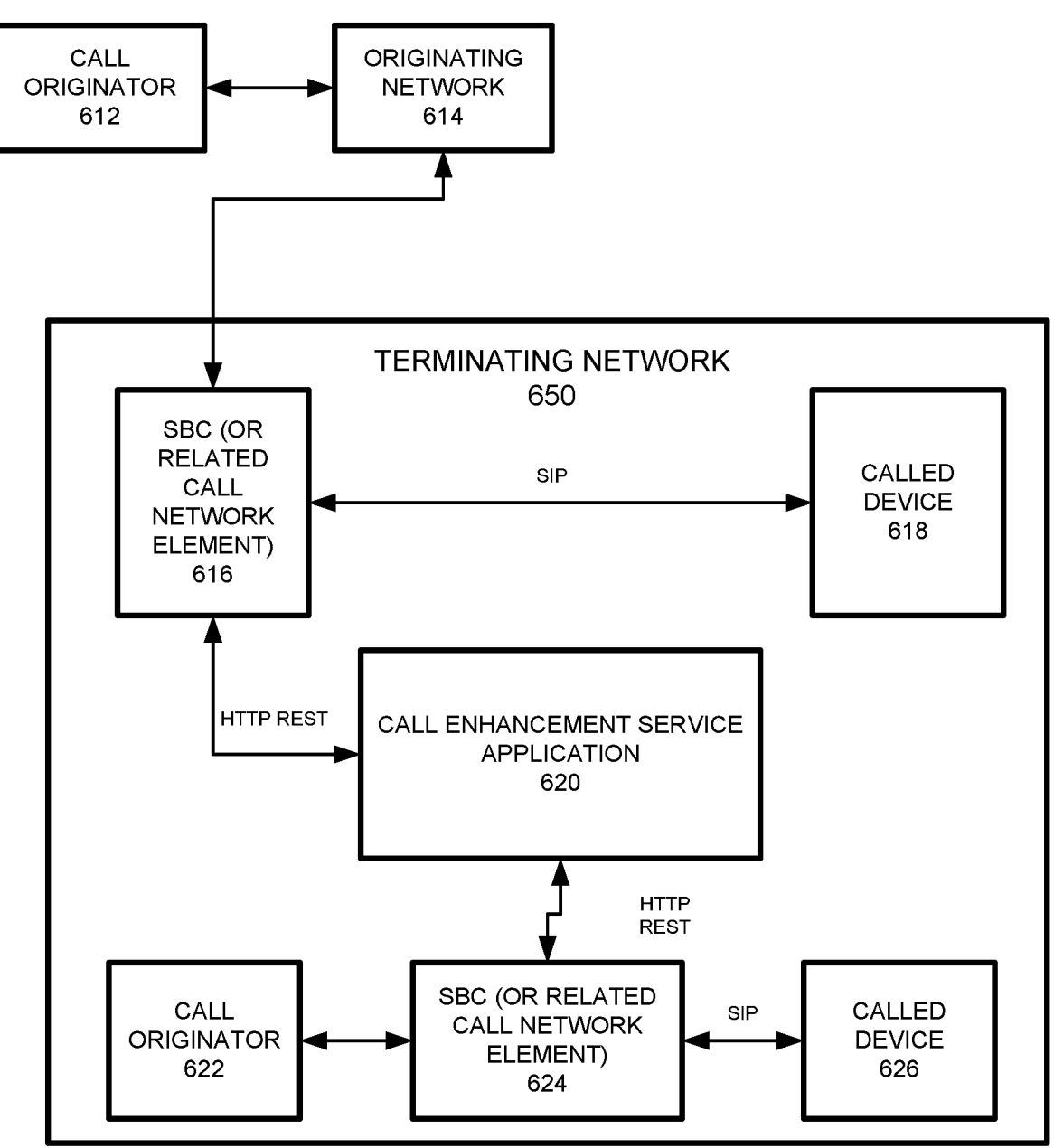
FIG. 7 illustrates a call enhancement service process with REST API integration according to example embodiments.

FIG. 7 illustrates a call enhancement service process with REST API integration according to example embodiments. Assuming the end device 618/626 is SIP based, the flow is basically the same except a network element performs the interworking into the signaling instead of the CESA directly. The API permits the network to query the CESA for the program information, which is returned if there is a program match. If there is no match, a non-200 response is returned. The CESA 620 will utilize a HTTP REST interface for the SBC 616/624 or related call elements.

Figure 8:
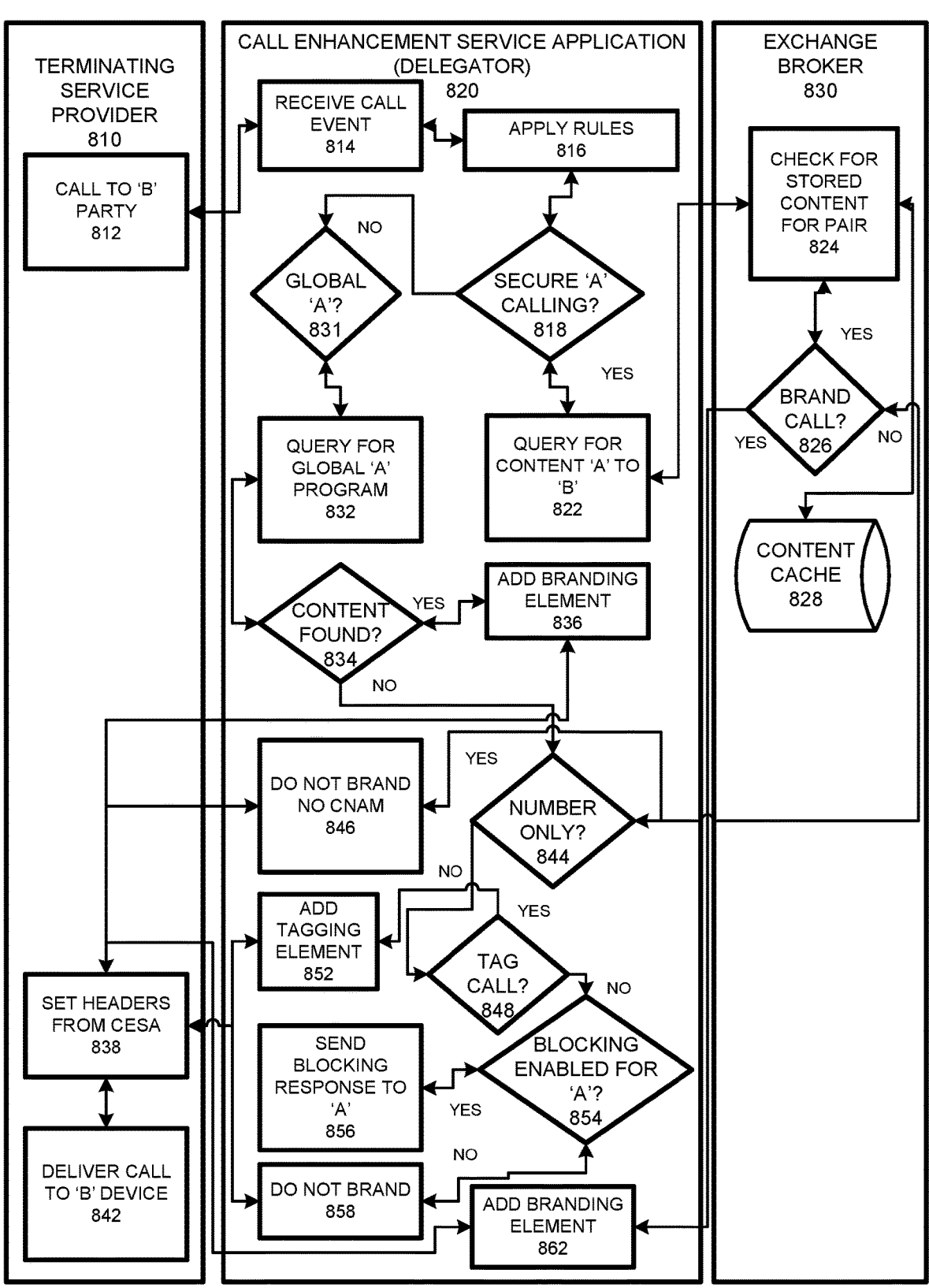
FIG. 8 illustrates a call enhancement service call logic flow according to example embodiments.

FIG. 8 illustrates a call enhancement service call logic flow according to example embodiments. Referring to FIG. 8, the terminating service provider (TSP) 810 will identify a call 812 destined for delivery to a 'B' device. The CESA delegator 820 will receive the call event 814, apply rules for the call 816 and determine whether 'A' is identified as secure 818. The 'A' number should be examined to identify whether it is eligible for branded calling, if so, then it is further examined to identify whether it is setup for secure calling.

The secure call may be queried for content that corre-sponds to 'A' and 'B' 822. Content that is destined for 'B' based on 'A' may be queried based on the combination numbers not just one or the other. Also, the content may be based on one or the other party. A secure call is specific to a certain 'A'+'B' number combination and the CESA queries the broker with the 'A'+'B' number presented as part of the call signaling. The API query between the CESA and the broker is the critical check that the incoming call is in fact the one made aware to the exchange before the call is placed or as the call is placed with the TTL. This ensures the call is secure and branded. The results from the query 822 are shared with operation 824 to determine whether a match occurred and whether to brand the call or not. The service logic within the CESA 820 provides the branding for the call and delivering an authenticated call if the pre-call setup is used. Other call handling options will be used if the calling number is provisioned for branded calls but there is not a valid program available to guide the enhanced call data processing.

When the CESA 820 is notified of a call from the network, a determination is made as to whether the calling number provided is provisioned for branded calling. If the calling number is not provisioned, no further checking is performed, and the network is informed that the call is not a branded call. If the calling number is integrated for pre-call setup, the CESA performs a secure API query to the exchange broker 830 to confirm the calling/called number pair match and whether there is any call specific content 824, which may be stored in a content cache 828. When 822 does not receive a match from 830, an error handling process (not shown) may be performed. If a pre-call program operation is not used, the CESA uses its locally stored data received from the exchange push/distribution broker. Once a call is identified as branded 826, a branding element 862 may be added. If the call is not branded for additional enhanced content, a decision may be made to provide only a number 844. For the number only approach, whatever was already in the calling name field is not displayed. The call enhancement service is not responsible for adding regular consumer calling name information. In this case there may also not be any CNAM data added 846.

When a call is not identified as being part of a secure party, the call may be queried for a global call type 831 and a global program may be queried to identify a global call process 832. If global call content is found 834 the branding element may be added to the call 836. When a call is provisioned for branded calling but there is not a program match available, the business or organization may exercise certain options on how to handle the call processing situation in addition to just letting the call continue normally with no modification. The options are available for secure calls using pre-call procedures and those calls which are not secure. The call may be blocked by the terminating network, in which case the CESA returns a special SIP or API response to the network. Alternatively, the call might be "tagged" with a configurable value if a decision 848 is made to perform the tagging. Tagging 852 the call data will populate the calling name value to indicate to the terminator network the call might be a scam, such as displaying "Possible Scam". Another option is to allow the call to go through but blanking the calling name altogether so there is no name or similar data associated with the number to help ensure no calling name, even from another service such as CNAM, is displayed. Blocking may be enabled 854 for the 'A' party if no tagging is enabled. A blocking response 856 is sent to the origination party 'A' to notify the calling party about the calling result. If blocking is not enabled, the call may not be branded 858 and the headers may be set by the CESA 838 and delivered 842 to the recipient 'B' number device.

Additional information about the branded call may be provided to the TSP, for example, including validation passed for authenticated calls and/or enforcing a certain attestation level to confirm the call was STIR/SHAKEN standard verified. The CESA may insert a correlation ID into the call information URL to be used after the call to match the logo file fetch from the CDN to the original call. The CESA captures the correlation ID in its call detail records as well to further augment reporting capabilities.

For content information that is provided in the signaling, the end user 'B' device can display the enhanced call content information without additional processing operations. For example, the name in the 'From'/'P-Asserted-Identity' display name or subject string may be displayed on the device interface. In one example, if there is a SIP 'call-info' header or other standard header, the device will need to fetch the actual content from the CDN using the URL. If the device does not support a content fetch, the logo or picture will not be displayed, but this will not prevent the calling name or reason or other information associated with the call from being displayed as the information sources may be separate and in some cases unrelated.

Figure 9:
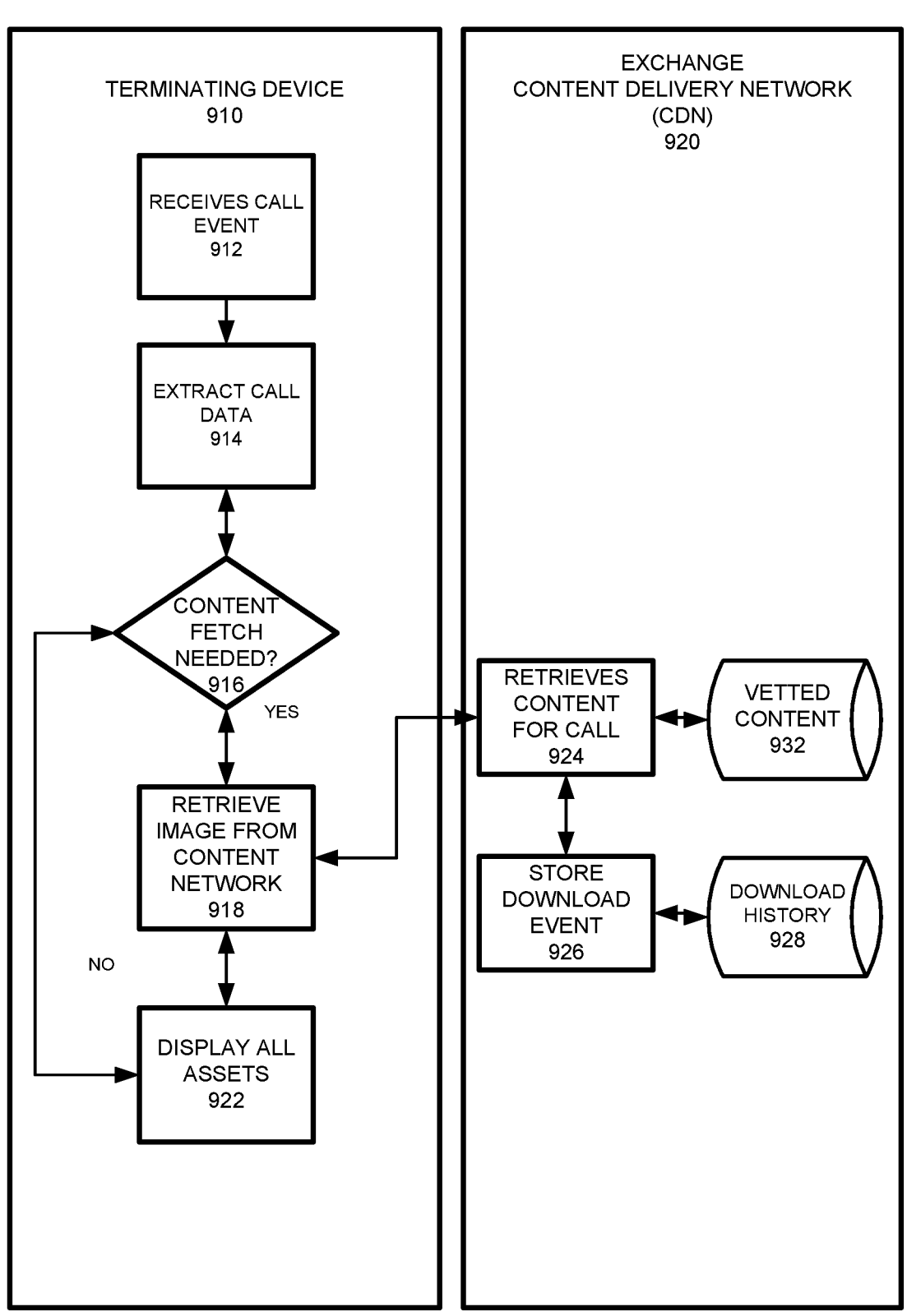
FIG. 9 illustrates a terminating device fetch process according to example embodiments.

FIG. 9 illustrates a terminating device fetch process according to example embodiments. Referring to FIG. 9, the logic flow for a device fetch operation occurs when there is a logo or picture file to display in addition to caller name data and/or call purpose information, such as a reason for the call, all of which are retrieved and paired with a calling party 'A' call destined for a called party 'B'. The CDN will attempt to identify a correlation ID value. When the terminating device attempts to fetch the logo, file, etc., from the CDN, the CDN will attempt to locate the correlation ID. If found, the content will be removed from the URL and stored for later correlation purposes. The fetch process may then continue. If identified, the value will be removed from the URL to return it to the original string value, so it does not interfere with the CDN locating the content. The pre-fetch logic will identify and remove the correlation ID for correlation with the CESA call detail records (CDRs) for a complete view of the branded call.

In operation, the terminating device 910 will receive a call event 912 which may be an active call. The terminating device 910 will generally receive the call in order to display the branded calling assets. The pre-call API operation is performed at the originating side of the call before the call is placed or as the call is placed. The terminating device will fetch content from the CDN once the call is received. The call data, 'A' caller, 'B' callee, call program, etc., may be extracted from the call event 914. Depending on the call data, an identifier may be used to determine whether a content fetch is needed 916. If so, image content may be retrieved from a content network 918. If not, the available assets displayed 922 without a content fetch. When a content fetch 916 is needed, the content retrieved may be from a CDN 920 that stores the data and retrieves the call data 924. The call event data or pre-call event data may be stored 926 in a download history 928 along with the vetted content 932.

Figure 10A:
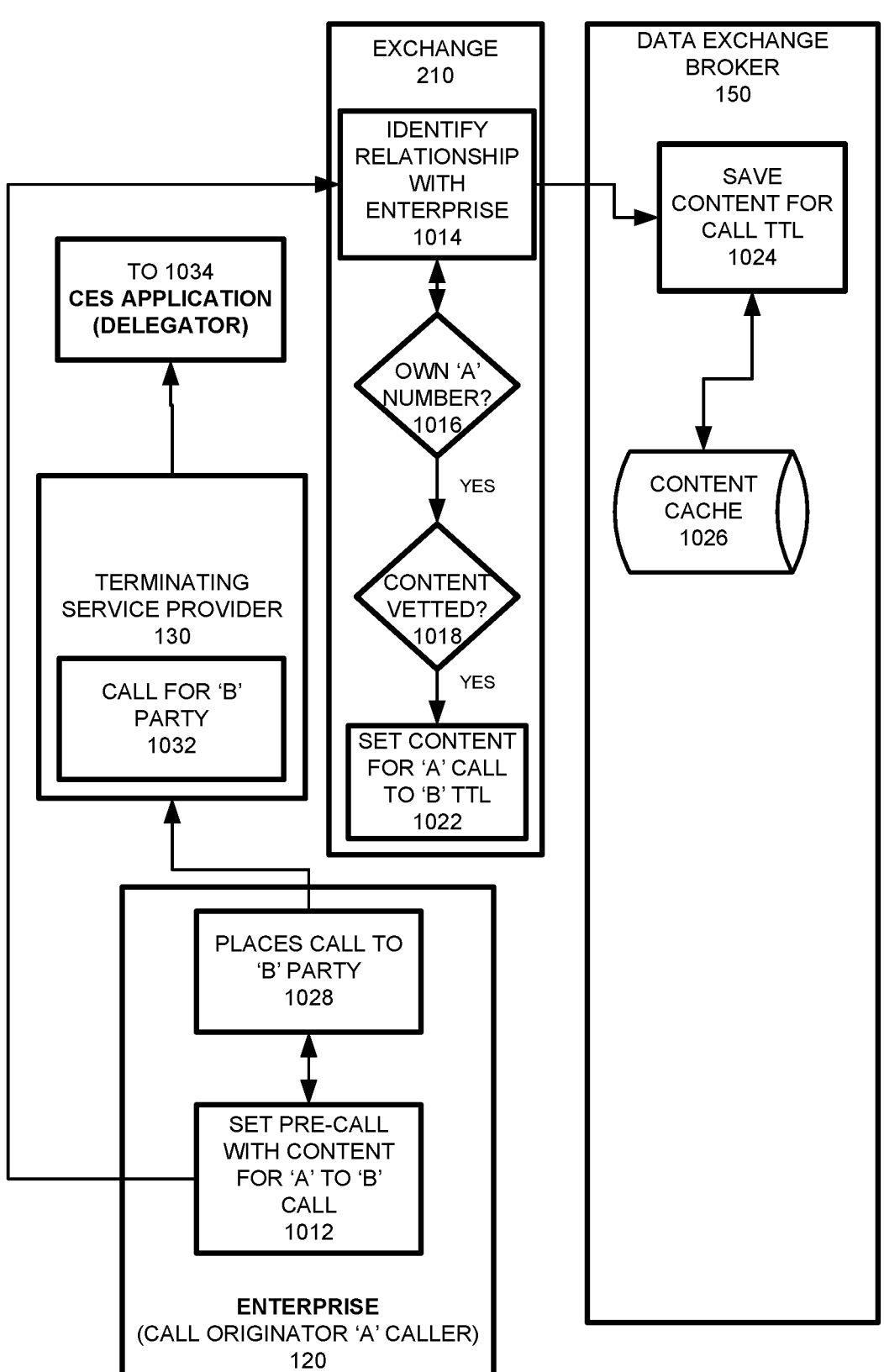
FIG. 10A illustrates a portion of a pre-call and CESA call service process according to example embodiments.
Figure 10B:
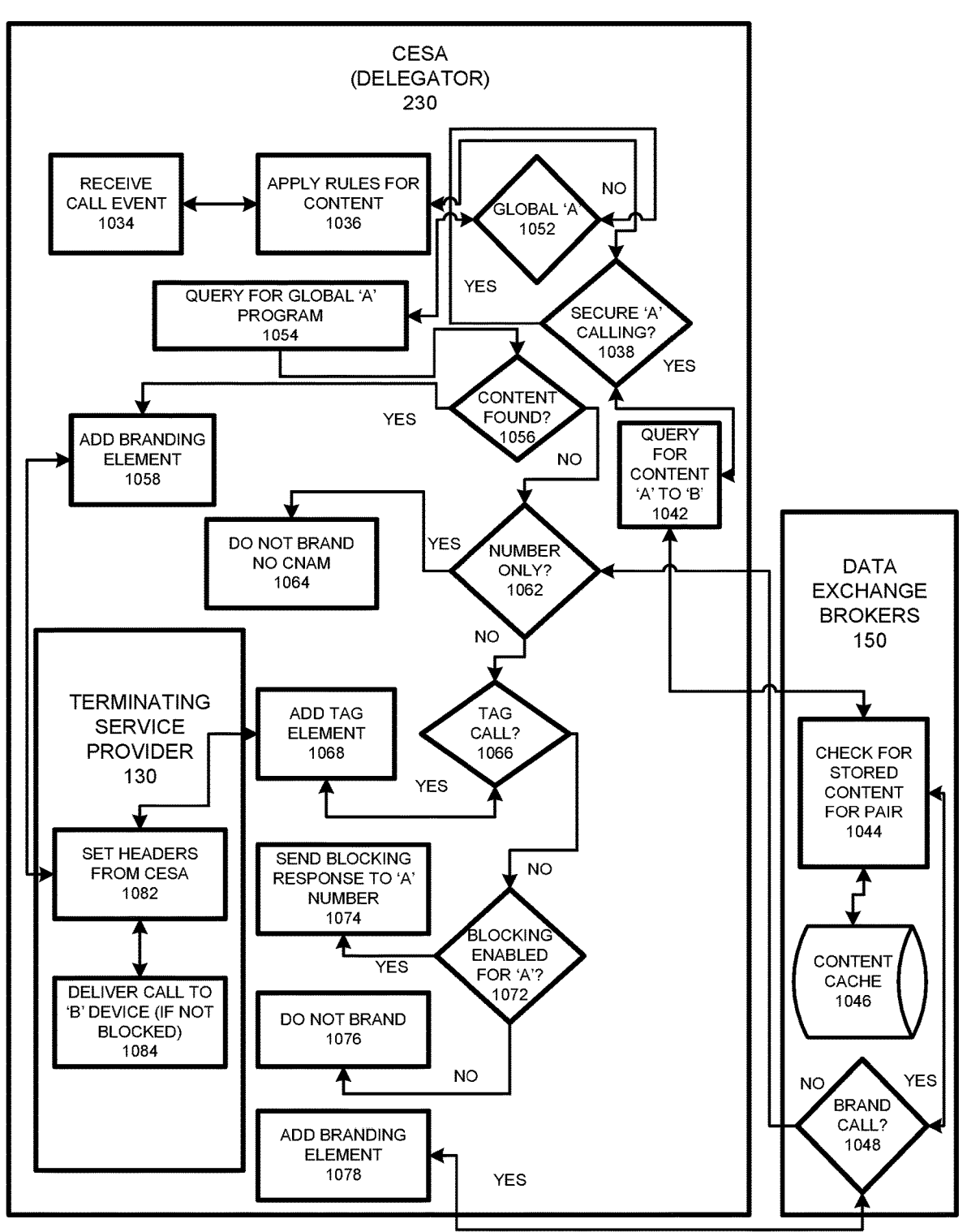
FIG. 10B illustrates a portion of a pre-call and CESA call service process according to example embodiments.

FIGS. 10A and 10B illustrate a pre-call and CESA call service process according to example embodiments. Referring to FIG. 10A, the use of the pre-call API is performed before or during the contact center or related call flow on the originating enterprise side 120 of the call flow. The pre-call API is used to inform the exchange 210 and therefore the CESA what calling and called party number pair will be used for the call. This operation of setting pre-call content 1012 for both 'A' and 'B' parties is considered out-of-band as the call itself is not placed yet and the operations are still in a pre-call phase. The pre-call API is the first half of the secure calling logic performed on the originating side of the call. The other half of the secure calling logic is on the terminating side of the call by the CESA using an API to query an exchange broker.

The exchange 210 checks to ensure the API caller is permitted to use the pre-call path with correct permissions (based on contract, vetting, etc.), and the identity 1014 of the enterprise must be confirmed before any content is set. Security is implemented in the exchange 210 to identify ownership of the calling number and business. Validation that the business/enterprise owns the telephone number ('A' number) must be confirmed 1016 or the pre-call functionality cannot be used for branded calling.

The exchange 210 verifies the content has passed vetting 1018, including moderation and elicit detection models to ensure the content can be used for branded calling 1022. When verification passes, the exchange broker 150 on the terminating side of the call flow sets the content for a short time-to-live (TTL) period 1024 that is valid for a specific subsequently placed call. At this point, the upcoming call is referred to as a "paired" call. The broker 150 saves the content in a cache 1026 for fast access during call processing at a later time. The program data is also saved in the cache.

After the pre-call API process is completed by the enterprise and corresponding software tools functions of the exchange and broker, a call is originated 1028 or continues with the call flow via normal call processing and routing. The call to the called party is delivered 1032 to the terminating service provider's (TSP) network 130. The terminating network receives the call to its subscriber and invokes 1034 the CESA using SIP or a REST API.

Once the CESA 230 receives the call event, logic rules 1036 are applied to the call event data. A privacy check is performed to determine whether privacy is applied to the call. If so the CESA logic is concluded at this point, and this is not an error case. If the call has privacy set or is a "normal" call, the call is returned to TSP 130. If privacy is not set, the calling number is checked if it is approved for branded calling. If not approved, the call is not branded. If this is the case, the call is a "normal" call, and this is not an error. The CESA logic concludes at this point. If the calling number is approved for branded calling the CESA logic continues.

The calling number may be approved for branded calling and now is checked to see if it is using a secure paired call flow 1038. If yes, the process continues to query for content associated with the pair 1042. If not, a global call analysis May 1052 be performed to determine whether the call is a global call type. If the calling number is identified as paired then the calling number is setup for secure calling, and the CESA queries the broker in real-time via the A/B pair API to confirm the calling/called number pairing and content for the specific call. The exchange broker 150 receives the A/B pair API request from the CESA and queries 1044 the local cache 1046 for a match. If a match is found, a positive response is returned to the CESA and if the call should be branded 1048 the branding element is added 1078. If a match is not found, then a number only approach is followed 1062 to begin CESA error handling logic. Other approaches may be used to determine whether a match has occurred.

The calling number is not using a secure paired call flow; instead, it is a "global" calling number, which will not utilize the CESA A/B Pair API with the Exchange. When a global 'A' type of call is potentially identified, a query is sent to the CESA local resident program database for a global program match 1054. A "global" program uses match logic to identify whether the called number could be an exact match or it could be part of a block or range of telephone numbers used in a global call event. If a match is found 1056, a positive response is returned to the TSP 130 using SIP or REST API response, whichever approach was used previously with branded content added 1058. The CESA logs the information as a successful branding event (e.g., for reporting, billing, auditing, etc.). Headers may be set 1082 and the call is ready to be delivered 1084 assuming it is not blocked 1084.

In the event that a match was not found a CESA error handling logic is performed. If a "Number Only" error is set for the calling number in the case of no match then the call is not branded with CNAM data and other enhanced data 1064, again, other approaches for determining a match or lack thereof are contemplated. If a "Number Only" error handling is set for the calling number in case of no match, then the CESA returns the call back to the TSP 130 using SIP or a REST API response, whichever approached was used previously without branded content 1064 and the calling name field is blanked to ensure no calling party identification is delivered to the called party other than the calling number. The CESA logs this error event for follow-up as needed (reporting, troubleshooting, auditing, etc.). If a "Tag" call error handling is set for the calling number then a "Tag" error handling 1066 is set for the calling number if no match. The CESA 230 returns the call back to the TSP 130 using SIP or REST API response, whichever approached was used previously with no branding but with a configurable "tag" value 1068 placed in the calling name field to indicate a possible scam. For example, the tag value could be "Scam Likely" or "Possible Scam", etc. The CESA logs this error event for follow-up as needed (e.g., reporting, troubleshooting, auditing, etc.).

If "Blocking" error handling is set for the calling number with no match 1072, the CESA 230 returns the call back 1074 to the TSP 130 as a configurable SIP or REST response error code to indicate the call must be released/terminated. This is a case in which the CESA 230 informs the TSP 130 not to deliver the call to the called party. The CESA logs this error event for follow-up as needed (reporting, troubleshooting, auditing, etc.). The default error handling cause is set for the calling number if there is no match, sending the call back to the TSP 130 to continue on with no branding 1076 or any other modification to the original call. The only special action the CESA takes in this "continue" error case is logging the error event for follow-up as needed (reporting, troubleshooting, auditing, etc.). The CESA 230 completes the successful secure paired flow by returning a positive response to the TSP 130 using SIP or a REST API response, whichever approach was used with the branded content. This approach occurs when pre-call API is used and the real-time API check is successful with no errors. The CESA 230 logs this as a successful branding event (for reporting, billing, auditing, etc.). The TSP network element uses the response from the CESA response make determination on next step for the call: brand, tag, release, continue unmodified, etc. If the call is not blocked, the TSP continues with call setup toward the called device. If call is blocked, the TSP releases the call back to the originator.

Figure 11A:
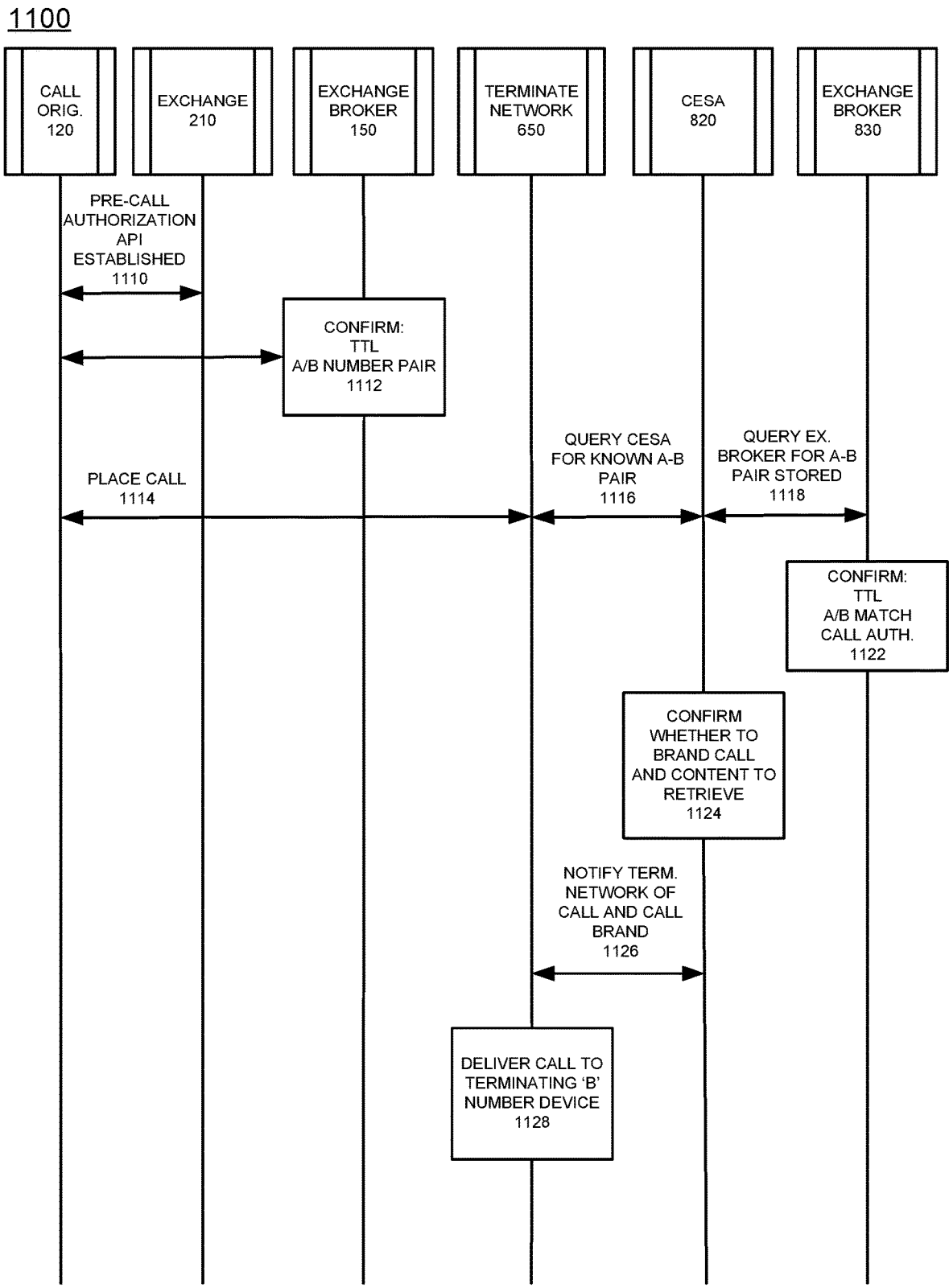
FIG. 11A illustrates a system diagram of pre-call authorization for a call setup process according to example embodiments.

FIG. 11A illustrates a system diagram of pre-call authorization for a call setup process according to example embodiments. Referring to FIG. 11A, the pre-call process may include an application programming interface (API) used to initiate a call program to identify a number pair and whether to brand a call based on the existence of the call pair. In one example, the process may include determining whether the call number 'A' and called number 'B' are identified as having a pre-existing relationship and are authorized to be part of a call process. The API between the calling origination entity (enterprise) 120 and the exchange 210 is used to authorize the pre-call 1110. The API will determine if the 'A' and 'B' numbers match by using the exchange broker service 150 to confirm the A/B number pair existence and a TTL 1112 for the call content pairing and branding service to be performed.

The call can be placed as part of the pre-call process 1114 to the termination network 650 to inform the termination network of the call and initiate potential branding processes. The 'A' and 'B' numbers may be queried at the CESA 820 by the termination network 650 to determine whether a relationship exists 1116. The query is sent 1118 to a termination side exchange broker 830 which can confirm the existence of the A/B number relationship, the TTL and other parameters 1122 governing the call branding portion of the call process. The CESA 820 will confirm the need or lack thereof to brand the call 1124 depending on the A/B relationship. A notification is sent to retrieve or assign the call content 1126 by an existing call management program. The terminating network 650 will deliver the call to a terminating number 'B' device 1128 and the content is paired with the call information or retrieved by the device depending on the approach used to finalize the call and call content.

FIG. 11B illustrates an example process of performing a pre-call operation according to example embodiments. Referring to FIG. 11B, the process may include receiving a pre-call setup message 1152 from a calling entity at a server and responsive to receiving the pre-call setup message, identifying call content delivery instructions associated with the calling entity 1154, a pre-call setup may be performed when a calling device has indicated a call is going to be placed in the future or when a calling device has initiated a call, the process may also include identifying enhanced call content 1156 to include with a future call based on a call program currently being used to manage the calls from a calling entity and/or associated with a called entity, and storing a calling entity number, a corresponding call recipient device number associated with a call recipient device and the enhanced call content in memory for a time to live (TTL) period 1158. The calling party number and called party numbers ('A' and 'B' numbers) along with an assigned TTL are parameters which are stored in a temporary cache of the call server or other entity to be used during the call establishment process. Those parameters are used to identify any enhanced call content needed to be sent to the call recipient during the call.

The process may also include creating a time to live (TTL) period associated with the calling entity and the call recipient device. The pre-call setup message includes a plurality of calling entity numbers at least one of which is used during the future call placed from the calling entity to the call recipient device. The call content delivery instructions may include preferences for enhanced call content types to be delivered to the call recipient device. The process may also include receiving the future call at a later time, and determining whether to tag the call based on the preferences for the enhanced call content types. The process may also include delivering the tagged enhanced call content to the call recipient device. And authorizing the future call for the TTL period.

FIG. 11C illustrates an example process of performing a pre-call and subsequent call setup operation according to example embodiments. Referring to FIG. 11C, the process may include receiving a call event message associated with a call from a calling entity at a server 1162, extracting call data from the call event message identifying enhanced content delivery instructions associated with the calling entity 1164, retrieving enhanced call content to include with the call 1166, and providing a portion of the enhanced call content to a call recipient device and a link to additional portions of the enhanced call content 1168.

The process may also include establishing the call to the call recipient device when a confirmation is received that all the enhanced call content is loaded on the call recipient device. The process may also include receiving the confirmation responsive to the portion of the enhanced call content being delivered to the call recipient device and the link to the additional portions of the enhanced call content has been accessed, initiating a time to live (TTL) for the call to be authorized for routing to the call recipient device, receiving a confirmation that pre-call processing has completed prior to a call being placed to a terminating service provider network, and the confirmation may include an acknowledgement that the enhanced call content is retrieved and stored in memory at the server. The process may also include querying a database to identify a relationship between a calling number ('A' number) and a called number ('B' number), and when the relationship exists, authorizing the call and initiating a time to live parameter identifying a period during which the call may be placed to the call recipient device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 12:
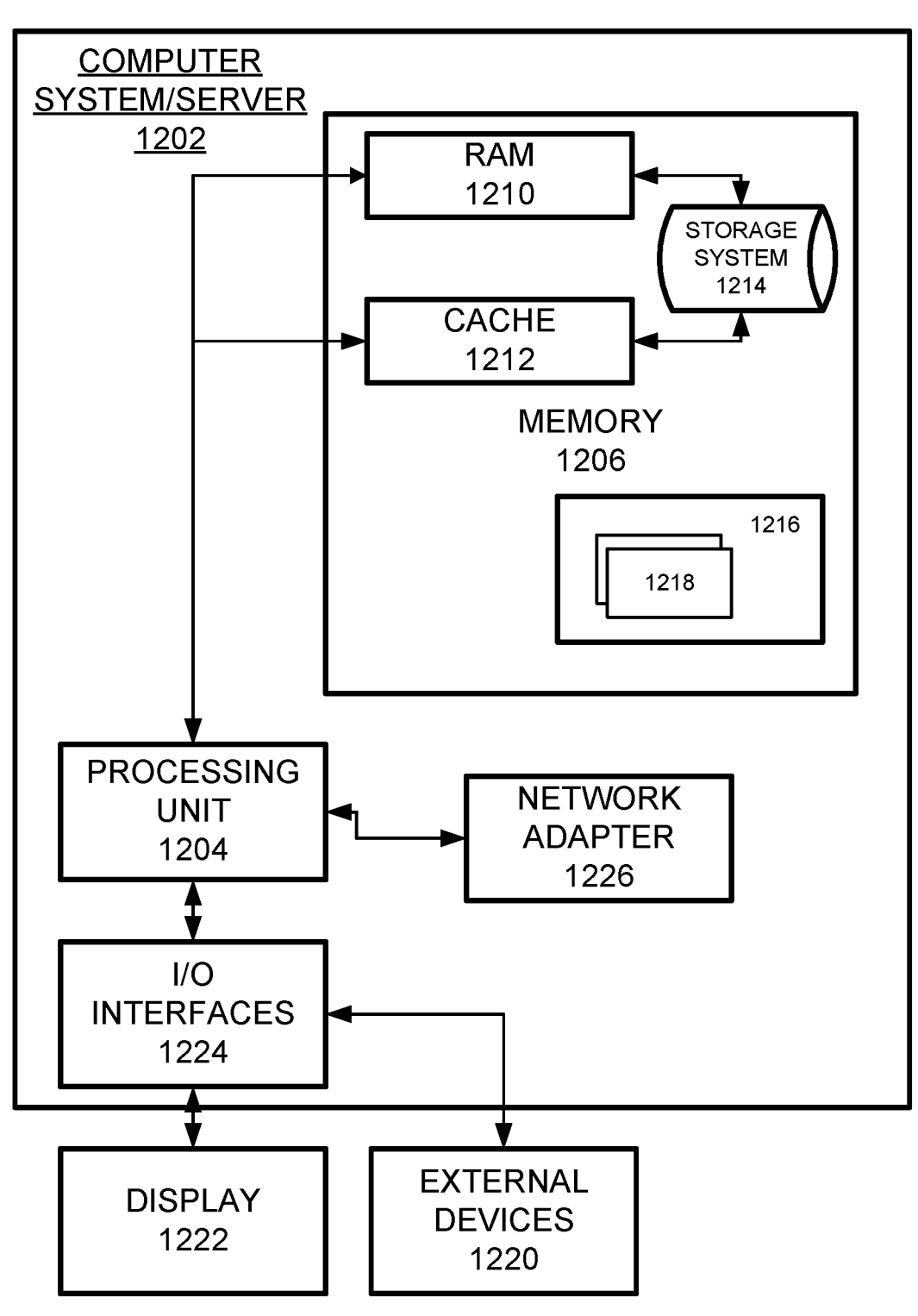
FIG. 12 illustrates an example network entity device configured to store instructions, software, and corresponding hardware for executing the same according to example embodiments.

FIG. 12 is not intended to suggest any limitation as to the scope of use or functionality of embodiments of the application described herein. Regardless, the computing node 1200 is capable of being implemented and/or performing any of the functionality set forth hereinabove.

In computing node 1200 there is a computer system/server 1202, which is operational with numerous other general purpose or special purpose computing system environments or configurations. Examples of well-known computing systems, environments, and/or configurations that may be suitable for use with computer system/server 1202 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 12, computer system/server 1202 in cloud computing node 1200 is displayed in the form of a general-purpose computing device. The components of computer system/server 1202 may include, but are not limited to, one or more processors or processing units 1204, a system memory 1206, and a bus that couples various system components including system memory 1206 to processor 1204.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media. System memory 1206, in one embodiment, implements the flow diagrams of the other figures. The system memory 1206 can include computer system readable media in the form of volatile memory, such as random-access memory (RAM) 1210 and/or cache memory 1212. Computer system/server 1202 may further include other removable/non-removable, volatile/non-volatile computer system storage media. By way of example only, storage system 1214 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1206 may include at least one program product having a set (e.g., at least one) of program modules that are configured to carry out the functions of various embodiments of the application.

Program/utility 1216, having a set (at least one) of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1202 may also communicate with one or more external devices 1220 such as a keyboard, a pointing device, a display 1222, etc.; one or more devices that enable a user to interact with computer system/server 1202; and/or any devices (e.g., network card, modem, etc.) that enable computer system/server 1202 to communicate with one or more other computing devices. Such communication can occur via I/O interfaces 1224. Still yet, computer system/server 1202 can communicate with one or more networks such as a local area network (LAN), a general wide area network (WAN), and/or a public network (e.g., the Internet) via network adapter 1226. As depicted, network adapter 1226 communicates with the other components of computer system/server 1202 via a bus. It should be understood that although not displayed, other hardware and/or software components could be used in conjunction with computer system/server 1202. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving a call event message associated with a call from a calling entity at a server;
extracting call data identifying enhanced content delivery instructions associated with the calling entity from the call event message;
retrieving enhanced call content to include with the call;
providing a portion of the enhanced call content and a link to an additional portion of the enhanced call content to a call recipient device;
receiving a confirmation that the call recipient device has received the portion of the enhanced call content and the additional portion of the enhanced call content; and
in response to the confirmation, initiating a time to live (TTL) for the call to be authorized for routing to the call recipient device.

2. The method of claim 1, comprising:
establishing the call to the call recipient device in response to receiving the confirmation.

3. The method of claim 1, comprising:
receiving a confirmation that pre-call processing has completed before a call is placed to a terminating service provider network.

4. The method of claim 3, wherein the confirmation comprises an acknowledgement that the enhanced call content has been retrieved and stored in memory at the server.

5. The method of claim 1, comprising:
identifying a relationship between a calling number and a called number based on a query to a database; and
in response to identifying the relationship, authorizing the call, and initiating a time to live parameter that identifies a period during which the call may be placed to the call recipient device.

6. An apparatus comprising:
a receiver configured to receive a call event message associated with a call from a calling entity; and
a processor configured to:
extract call data identifying enhanced content delivery instructions associated with the calling entity from the call event message;
retrieve enhanced call content to include with the call;
provide a portion of the enhanced call content and a link to an additional portion of the enhanced call content to a call recipient device;
receive a confirmation that the call recipient device has received the portion of the enhanced call content and the additional portion of the enhanced call content; and in response to the confirmation, initiate a time to live (TTL) for the call to be authorized for routing to the call recipient device.

7. The apparatus of claim 6, wherein the processor is further configured to:
establish the call to the call recipient device in response to receiving the confirmation.

8. The apparatus of claim 6, wherein the processor is further configured to:
receive a confirmation that pre-call processing has completed before a call is placed to a terminating service provider network.

9. The apparatus of claim 8, wherein the confirmation comprises an acknowledgement that the enhanced call content has been retrieved and stored in memory.

10. The apparatus of claim 6, wherein the processor is further configured to:
identify a relationship between a calling number and a called number based on a query to a database; and
in response to the relationship being identified, authorize the call, and initiate a time to live parameter that identifies a period during which the call may be placed to the call recipient device.

11. A non-transitory computer-readable storage medium comprising instructions that, when executed by a processor, cause the processor to perform:
receiving a call event message associated with a call from a calling entity at a server;
extracting call data identifying enhanced content delivery instructions associated with the calling entity from the call event message;
retrieving enhanced call content to include with the call;
providing a portion of the enhanced call content and a link to an additional portion of the enhanced call content to a call recipient device; receiving a confirmation that the call recipient device has received the portion of the enhanced call content and the additional portion of the enhanced call content; and
in response to the confirmation, initiating a time to live (TTL) for the call to be authorized for routing to the call recipient device.

12. The non-transitory computer-readable storage medium of claim 11, wherein the instructions cause the processor to perform:
establishing the call to the call recipient device in response to receiving the confirmation.

13. The non-transitory computer-readable storage medium of claim 11, wherein the instructions cause the processor to perform:
receiving a confirmation that pre-call processing has completed before a call is placed to a terminating service provider network.

14. The non-transitory computer-readable storage medium of claim 13, wherein the confirmation comprises an acknowledgement that the enhanced call content has been retrieved and stored in memory at the server.

* * * * *